United States Patent
McLaughlin et al.

(10) Patent No.: US 9,056,250 B2
(45) Date of Patent: Jun. 16, 2015

(54) SYSTEMS AND METHODS FOR HANDLING COMMUNICATION EVENTS IN A COMPUTER GAMING SYSTEM

(75) Inventors: Mark McLaughlin, Surrey (GB); Henrique Penha, London (GB)

(73) Assignee: Skype, Dublin (IE)

( * ) Notice: Subject to any disclaimer, the term of this patent is extended or adjusted under 35 U.S.C. 154(b) by 425 days.

(21) Appl. No.: 12/455,651

(22) Filed: Jun. 4, 2009

(65) Prior Publication Data

US 2010/0062856 A1 Mar. 11, 2010

(30) Foreign Application Priority Data

Sep. 9, 2008 (GB) .................................. 0816483.2

(51) Int. Cl.
*G06F 15/00* (2006.01)
*A63F 13/30* (2014.01)
*H04L 29/06* (2006.01)
*H04L 29/08* (2006.01)

(52) U.S. Cl.
CPC ............ *A63F 13/12* (2013.01); *A63F 2300/408* (2013.01); *A63F 2300/308* (2013.01); *A63F 2300/306* (2013.01); *A63F 2300/556* (2013.01); *A63F 2300/572* (2013.01); *H04L 65/1069* (2013.01); *H04L 67/36* (2013.01); *H04L 67/38* (2013.01)

(58) Field of Classification Search
CPC .............. A63F 13/12; A63F 2300/308; A63F 2300/408; A63F 2300/556; A63F 2300/572
USPC .................................................... 463/40–42
See application file for complete search history.

(56) References Cited

U.S. PATENT DOCUMENTS 6,405,249 B1 6/2002 Matsuda et al.
7,036,082 B1 * 4/2006 Dalrymple et al. ........... 715/757
(Continued)

FOREIGN PATENT DOCUMENTS

GB 2447094 A 9/2008
GB 2447096 A 9/2008
(Continued)

OTHER PUBLICATIONS

Search Report from GB0816483.2, mailed on Dec. 7, 2009.
(Continued)

*Primary Examiner* — Lawrence Galka
(74) *Attorney, Agent, or Firm* — Sonia Cooper; Jim Ross; Micky Minhas (57) ABSTRACT

A method of establishing a communication event between a first user and a second user of a communication system; wherein the first user operates a user terminal executing an electronic game application; the method comprising the steps of:
storing contact information for at least the second user of the communication system;
associating the contact information of the second contact with one or more game objects in the electronic game application;
receiving an input signal from the first user to interact with a game object displayed during execution of the electronic game application; and
responsive to receiving the signal to interact with the game object, establishing a communication event between the first user of the game application and the second user of the communication system using the contact information associated with the game object.

20 Claims, 5 Drawing Sheets

(56) References Cited

U.S. PATENT DOCUMENTS

| | | | |
|---|---|---|---|
| 7,086,005 B1* | 8/2006 | Matsuda | 715/706 |
| 8,117,550 B1* | 2/2012 | Izdepski et al. | 715/753 |
| 2002/0086732 A1 | 7/2002 | Kirmse et al. | |
| 2003/0225846 A1* | 12/2003 | Heikes et al. | 709/207 |
| 2004/0056901 A1 | 3/2004 | March et al. | |
| 2006/0003824 A1 | 1/2006 | Kobayashi et al. | |
| 2006/0193301 A1* | 8/2006 | Cheng et al. | 370/338 |
| 2007/0082738 A1* | 4/2007 | Fickie et al. | 463/42 |
| 2008/0004117 A1 | 1/2008 | Stamper et al. | |
| 2008/0030496 A1 | 2/2008 | Lee et al. | |
| 2008/0070691 A1* | 3/2008 | Hutchinson et al. | 463/42 |
| 2008/0215971 A1* | 9/2008 | Gillo et al. | 715/706 |
| 2008/0263460 A1* | 10/2008 | Altberg et al. | 715/757 |
| 2009/0300525 A1* | 12/2009 | Jolliff et al. | 715/764 |

FOREIGN PATENT DOCUMENTS

| | | | |
|---|---|---|---|
| WO | WO 03/034196 A1 | 4/2003 | |
| WO | WO 2005/009019 A2 | 1/2005 | |
| WO | WO 2007/125388 A1 | 11/2007 | |
| WO | WO 2007/147151 A2 | 12/2007 | |

OTHER PUBLICATIONS

Farella, E., et al., "Multi-Client Cooperation and Wireless PDA Interaction in Immersive Virtual Environment," *Eighth Annual Scientific Conference on Web Technology, New Media Communications and Telematics Theory Methods, Tools and Applications Eurosis Ghent, Belgium*:177-184 (2003).

Farella, E., et al., "Pervasive Computing for Interactive Virtual Heritage," *IEEE Multimedia, IEEE Service Center,* New York, New York 12(3):46-58 (2005).

Gomes, R.L., et al., "Integrating Collaborative Applications with LEICA," *Information Technology: Research and Education*:292-296 (2005).

Kadavasal, M.S., et al., "Mixed Reality for Enhancing Business Communications Using Virtual Worlds," *Proceedings of the 2007 ACM Symposium on Virtual Reality Software and Technology*:233-234 (2007).

McCahill, M.P., et al., "Extending Croquet Spaces with Vector Fields, Vehicles, and Virtual Presence," *Proceedings of the Fourth International Conference on Creating, Connecting and Collaborating Through Computing*:68-72 (2006).

Prasolova-Førland, E., et al., "Supporting Social Awareness with 3D Collaborative Virtual Environments and Mobile Devices: VirasMobile," *Second International Conference on IEEE*:33-38 (2007).

Tanaka, T., et al., "Unconsciously Harmonized Online Communication Based on Uninterruptibility Estimation of Interaction Partners," *Computer-Human Interaction, [Lecture Notes in Computer Science]* 5068:77-85 (2008).

Notification of Transmittal of the International Search Report and the Written Opinion of the International Searching Authority, or the Declaration, from International Application No. PCT/EP2009/061572, Date of Mailing: Feb. 15, 2010.

\* cited by examiner

SYSTEMS AND METHODS FOR HANDLING COMMUNICATION EVENTS IN A COMPUTER GAMING SYSTEM

RELATED APPLICATION

This application claims priority under 35 U.S.C. §119 or 365 to Great Britain Application No. 0816483.2, filed Sep. 9, 2008. The entire teachings of the above application are incorporated herein by reference.

FIELD OF THE INVENTION

The present invention relates to a user interface in a computer gaming system for handling communication events in a communication system. In particular the invention relates, but not exclusively, to controlling an interface in a computer gaming system for handling communication events in a communication system.

BACKGROUND OF THE INVENTION

Voice over internet protocol ("VoIP") communication systems allow the user of a terminal, such as a personal computer, to make calls across a computer network such as the Internet. These systems are beneficial to the user as they are often of significantly lower cost than traditional telephony networks, such as fixed line or mobile networks. This may particularly be the case for long distance calls. To use a VoIP service, the user must install and execute client software on their terminal. The client software provides the VoIP connections as well as other functions such as registration and authentication. In addition to voice communication, the client may also provide video calling and instant messaging ("IM").

One type of VoIP communication system uses a peer-to-peer communication system built on proprietary protocols. To access the peer-to-peer communication system, the user must execute peer to peer client software provided by the operator of the peer to peer system on their user terminal, and register with the peer to peer system. When the user registers with the peer to peer system the client software is provided with a digital certificate from a central server. Once the client software has been provided with the certificate, communication can subsequently be set up and routed between users of the peer to peer system without the further use of a central server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a peer to system are disclosed in WO 2005/009019.

In a communication system, such as a peer to peer system, the client software installed on an end user terminal such as a personal computer (PC) allows the user of the user terminal to communicate with other users of the communication system. The user interface of the client software can be controlled to display details of other users of the communication system as a list of contacts stored by the user of the user terminal. The client user interface may also be controlled to display a list of recent events such as missed incoming calls or chat messages The user may navigate options presented by the client user interface in order to access the contact list and initiate a communication event with user of the communication network listed in the contact list. Alternatively the user may access the list of recent events by selecting an event history option in order to return a missed call or access a chat message.

Computer gaming systems form an integral part of many peoples' home entertainment systems. Gaming systems typically allow users to play a wide variety of games by loading and executing the appropriate software. The software creates a virtual game word representing, for example, a quiz game, or virtual reality in which the player can control one or more game characters. The player interacts with the game by means of various input devices such as control pads and a keyboard, and various output devices such as a monitor and speakers.

The enjoyment of many games may be enhanced by allowing two or more players to play a game simultaneously, for example to compete against each other in the game. If all players are located at the same place then each player may control a respective input device connected to the same game machine which runs the game software. In some cases, it is also possible for multiple players to participate together in a game when they are located remotely from each other. In this case, each player has a respective game machine which communicate with each other via a network such as the internet. Each game machine executes the game software and receives input signals from the input devices controlled by a respective player. These signals are transmitted over the network to one of the game machines designated as a master. The master receives the inputs and modifies the state of the game world accordingly. The master then transmits signals back to each of the other game machines representing the modified game state. The modified game state is updated in each of the game machines and displayed to the players.

While in the past computer games were generally played on general purpose computers, it has recently become increasingly common to use dedicated gaming consoles or machines. This means that the computer system used to make VoIP calls may be different to the system used to play games, and these two systems may even be located in different places. This results in the problem that if a game player wishes to make a call or receive an incoming call, they must interrupt the game and move to the computer used to take or receive the call. Even if the computer used to make and receive calls is the same as the one used to play the game, the game will still need to be interrupted to use the VoIP communication application.

It is an aim of the present invention to provide a method for a player of a game application to call friends while they are playing games, especially those participating in the game via the internet.

The present invention aims to solve these and other problems associated with existing systems.

In accordance with a first aspect, the invention provides a method of establishing a communication event between a first user and a second user of a communication system; wherein the first user operates a user terminal executing an electronic game application; the method comprising the steps of: storing contact information for at least the second user of the communication system; associating the contact information of the second contact with one or more game objects in the electronic game application; receiving an input signal from the first user to interact with a game object displayed during execution of the electronic game application; and responsive to receiving the signal to interact with the game object, establishing a communication event between the first user of the game application and the second user of the communication system using the contact information associated with the game object.

In accordance with a second aspect, the invention provides a system for establishing a communication event between a first user and a second user of a communication system; wherein the first user operates a user terminal executing an electronic game application; the system comprising: a memory for storing contact information for at least the second user of the communication system; means for associating the contact information of the second contact with one or more game objects in the electronic game application; an input for receiving an input signal from the first user to interact with a game object displayed during execution of the electronic game application; and communication means, responsive to receiving the signal to interact with the game object, establishing a communication event between the first user of the game application and the second user of the communication system using the contact information associated with the game object.

BRIEF DESCRIPTION OF DRAWINGS

For a better understanding of the present invention and as to how the same may be carried into effect, embodiments of the present invention will now be described with reference to the following drawings.

DETAILED DESCRIPTION

The inventors have recognised the potential for combining otherwise diverse techniques together with a computer game to improve the degree of interaction of a remote user: that is, to incorporate a communication client into a games system to allow a player of a game to call friends while they are playing games, especially those participating in the game via the internet.

Packet-based communication systems allow the user of a terminal to communicate across a computer network such as the Internet. Packet-based communication systems include voice over internet protocol ("VoIP") or video-over-IP communication systems. These systems are beneficial to the user as they are often of significantly lower cost than fixed line or mobile networks. This may particularly be the case for long-distance communication. To use a VoIP or video-over-IP system, the user must execute client software on their device. The client software provides the voice and video IP connections as well as other functions such as registration and authentication. In addition to voice and video communication, the client may also provide further features such as instant messaging ("IM" or "chat" messaging), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their terminal, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A communication client is embedded into a games system so as to enable a user to make live, packet-based calls from the games system. The client application is in the form of software stored in a memory and arranged for execution on a central processing unit (CPU), the memory and CPU being parts of the games system integrated together into a single household appliance, and hence sold together as a single product, in a single casing optionally with external peripherals such as game controllers. The game system product is preferably a "dedicated" or specialised games console, meaning at least that it has a default mode of operation as a games system.

Figure 1:
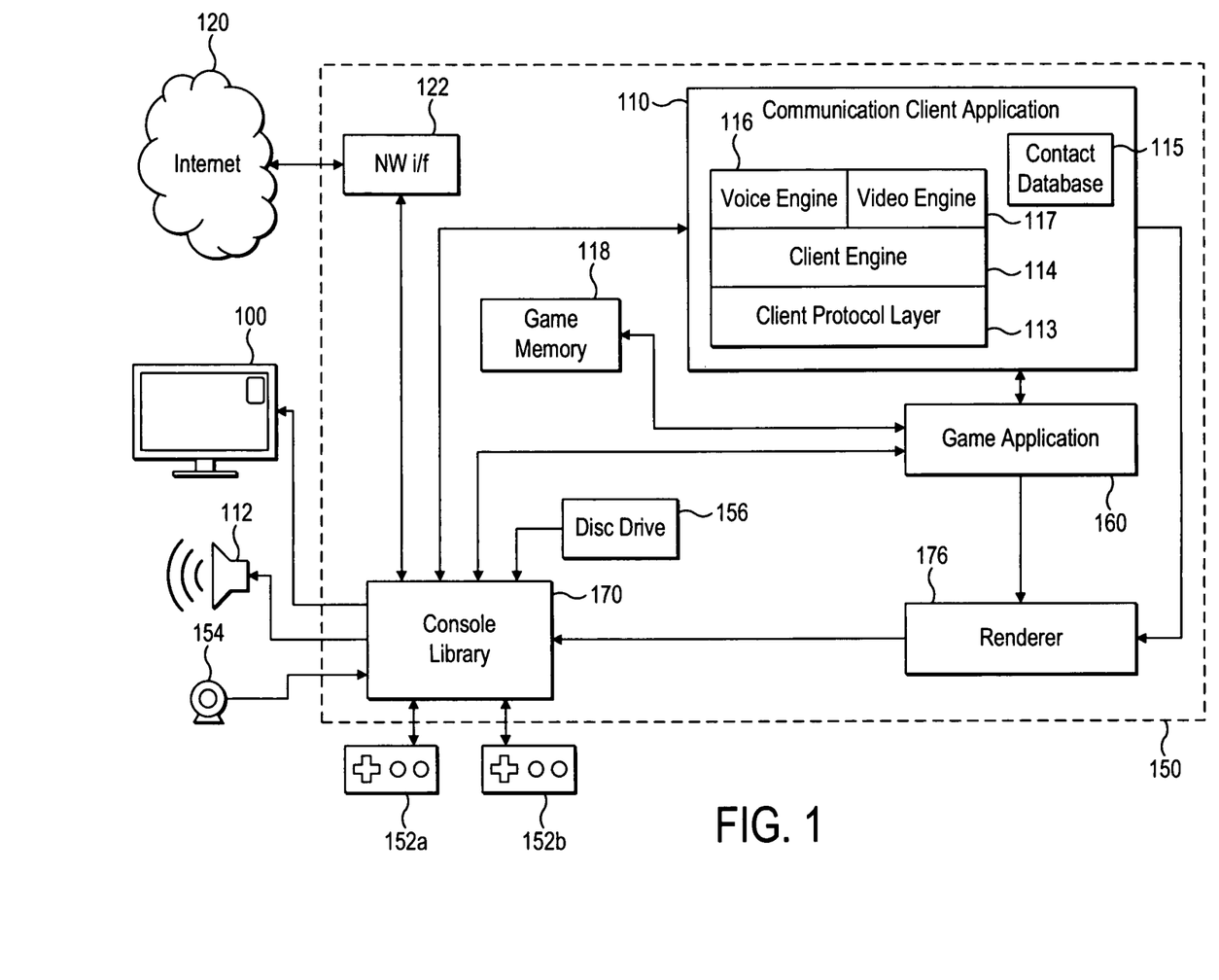
FIG. 1 shows a schematic block diagram of an electronic gaming system.

Reference is now made to FIG. 1, which is a schematic block diagram showing functional blocks of a games system 150 and connected peripherals. The games system 150 comprises a network interface 122 for connecting to the Internet 120. This network interface could be a built-in modem, or a wired or wireless interface connected to an external modem. The games console also comprises a storage reader, preferably a storage module reader with storage module receptacle for receiving and reading removable storage modules. The storage module reader is preferably in the form of a disc drive 156 for reading CDs, DVDs and/or other types of optical disc received via an appropriate slot or tray.

The game system 150 further comprises a console library 170, a game application 160, and a communication client application 110. Each of these blocks are preferably software elements stored on a memory and arranged to be executed on a processing apparatus of the games system 150. The processing apparatus (not shown) comprises at least one central processing unit (CPUs), and may comprise more than one CPU for example in an arrangement of a host CPU and one or more dedicated digital signal processors (DSPs) or a multi-core arrangement. The memory (also not shown) may be of a number of different types and the above software elements may be stored in the same memory or in different memories of the same or different types. For example, the communication client 110 may be installed on an internal hard-drive or flash memory of the games system 150, and the game application 160 may be stored on an optical disc and loaded via the disc drive 156 for execution. Alternatively, the game application could be copied from the optical disc onto the hard drive or flash memory of the game system 150, or downloaded from a server via the network interface 122 and Internet 120. In other embodiments, the client application 110 and/or game application 160 could be stored on an external hard drive or flash memory.

Given the different possible types of memory, note therefore that the game system's storage readers need not necessarily include only a storage module reader such as an optical disc drive, but could also include the reading mechanism of a hard drive, the read circuitry of a flash memory, or suitable software for accessing a server via the network interface 122.

The console library 170 is a basic system library which takes care of low level functions including input and output functions. The console library 170 is preferably stored on a memory internal to the games system 150, e.g. on a hard drive, flash memory or read-only memory (ROM).

The console library 170 is operatively coupled to the screen of a television set 100 via a television output port (not shown) of the games system 150. The console library is also operatively coupled to a loudspeaker 112, which although shown separately can be housed within the television set 100 and coupled to the console library 170 via the television output port. Alternatively another audio output source could be used such as headphones or a connection to a separate stereo or surround-sound system.

In order to receive user inputs from a local user of the games system 150, the console library 170 is operatively coupled to one or more game controllers 152 via one or more respective controller input ports (not shown) of the games system 150. These could comprise a more traditional arrangement of user controls such as a directional control pad or stick with accompanying buttons, and/or other types of user inputs such as one or more accelerometers and/or light sensors such that physical movement of the controller 152 provides an input from the user. The console library 170 can also be arranged to be able to receive audio inputs from a microphone in the controller 152 (or connected thereto) and provide outputs to a speaker housed in the controller 152, again via the controller port. Alternatively, a separate microphone input could be provided.

Optionally, in order to receive video data from the local user of the games system 150, the console library 170 is operatively coupled to a digital video camera 154, either a webcam or digital camera with video capability, via a camera input port or general purpose input port (not shown).

In order to load game applications or other software, the console library 170 is operatively coupled to the disc drive 156.

Further, the console library 170 is operatively coupled to the network interface 122 so that it can send and receive data via the Internet 120 or other packet-based network.

The console library 170 is operatively coupled to the game application 160, thus enabling inputs and outputs to be communicated between the game application 160 and the various I/O devices such as the TV set 100, loudspeaker 112, controllers 152, microphone 154, disc drive 156 and network interface 122. The console library 170 is also operatively coupled to the client application 110, thus enabling inputs and outputs to be communicated between the client application 110 and the I/O devices such as the TV set 100, loudspeaker 112, controllers 152, video camera 154, disc drive 156 and network interface 122.

The communication client 110 and game application 160 are connected to a renderer 176. The renderer 176 is responsible for rendering graphics for display on the TV set 100. The output of the renderer 176 is provided to the console library 170, such that the rendered graphics are sent for display on the TV set 100.

The game application 160 is operatively coupled to the client application thus enabling data to be transferred between the game application and the client application. For example, in a process described in greater detail below, the game application retrieves of a list of contacts stored by the client application. The game application also transmits game character identifiers to the client application to be stored in association with the contact list in the client application. The game application is also operatively coupled to a game memory 118 in which data used by the game application, such as game character identifiers, are stored.

The packet-based communication client 110 embedded in the games system 150 is based around four main elements. Preferably, these four elements are software elements that are stored in memory and executed on a CPU both embedded in the game system 150. The four elements are: a client protocol layer 113, a client engine 114, a voice engine 116, and a video engine 117.

The client engine 114, voice engine 116 and video engine 117 establish and conduct bidirectional, packet-based, point-to-point (including the possibility of point-to-multipoint) communications via a packet based communication network such as the Internet 120; e.g. by establishing a peer-to-peer (P2P) connection over a peer-to-peer network implemented over the Internet 120.

The protocol layer 113 deals with the underlying protocols required for communication over Internet 120.

The client engine 114 is responsible for setting up connections to the packet-based communication system. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the games system 150 as VoIP packet for transmission over the Internet 120 and the decoding of VoIP packets received from the Internet 120 for presentation as audio information to the user of the game system 150. The voice signals may be provided by the local user from a microphone in the controller 152 or separate microphone via the console library 170. The audio output may be output to the loudspeaker 170 via the console library 170.

The video engine 117 is responsible for the encoding of video signals input to the games system 150 as packets for transmission over the internet 120 in a video call, and the decoding of video packets received in a video call for presentation as video images to the TV set 100. The input video signals may be provided by the local user from the video camera 154 via the console library 170. The output video may be output to the TV set 100 via the renderer 176 and the console library 170.

The game application 160 comprises game logic responsible for receiving inputs from users and processing those inputs according to the rules of the game.

Figure 2:
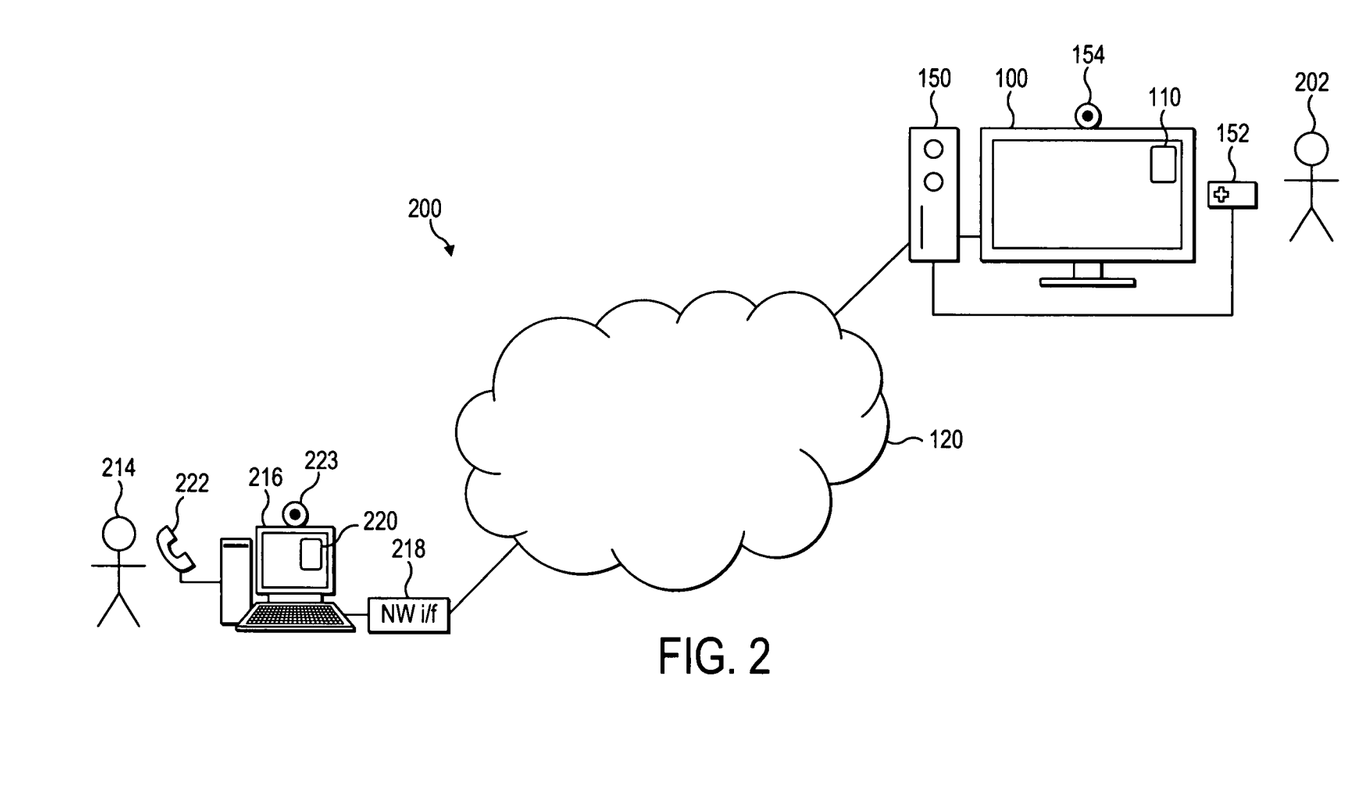
FIG. 2 shows a schematic diagram of a communication system.

In order to describe the operation of the games system 150 with the packet-based communication system, and particularly the operation of the game application 160 with the communication client 110, reference is now made to FIG. 2, which illustrates the use of the games system 150 in a portion of an example system 200.

Note that whilst this illustrative embodiment is described with reference to a P2P communication system, other types of non-P2P communication system could also be used. The system 200 shown in FIG. 2 shows a first user 202 of the communication system operating a TV 100, which is shown connected to a games system 150, which is in turn connected to a network 120. Note that the communication system 200 utilizes a network such as the Internet. The games system 150 is connected to the network 120 via a network interface (not shown) such as a modem, and the connection between the games system 150 and the network interface may be via a cable (wired) connection or a wireless connection.

The games system 150 is executing an embedded communication client 110. The games system 150 is arranged to receive information from and output information to the user 202. A controller 152 acts as the input device operated by the user 202 for the control of the games system 150.

The embedded communication client 110 is arranged to establish and manage voice and video calls made over the packet-based communication system using the network 120. The embedded communication client 110 is also arranged to retrieve information including a list of contacts associated with the user 202. Each contact in the contact list has a user-defined presence status associated with it, and each of these contacts have authorised the user 202 of the client 110 to use their contact details and presence state.

The contact list for the users of the packet-based communication system is stored in a contact server (not shown in FIG. 2). When the client 110 first logs into the communication system the contact server is contacted, and the contact list is downloaded to a contact database portion 115 of the client 110. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added.

Also connected to the network 120 is a second user 214. In the illustrative example shown in FIG. 2, the user 214 is operating a user terminal 216 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 216 comprises a display such as a screen and an input device such as a keyboard, mouse, joystick and/or touch-screen. The user device 216 is connected to the network 120 via a network interface 218 such as a modem.

Note that in alternative embodiments, the user terminal 216 can connect to the communication network 120 via additional intermediate networks not shown in FIG. 2. For example, if the user terminal 216 is a mobile device, then it can connect to the communication network 120 via a mobile network (for example a GSM or UMTS network).

The user terminal 216 is running a communication client 220, provided by the software provider. The communication client 220 is a software program executed on a local processor in the user terminal 216 comprising similar elements to the embedded communication client 110. The communication client 220 enables the user terminal 216 to connect to the packet-based communication system. The user terminal 216 is also connected to a handset 222, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 216, or integrated into the user terminal 216 itself. The user terminal 216 is also connected to a video camera 223, such as a webcam, which enables video images from the user terminal 216 to be sent in a video call.

Presuming that the first user 202 is listed in the contact list of the client 220 presented to second user 214, then the second user 214 can initiate a call to the first user 202 over the communication network 120. Similarly, the first user 202 can initiate a call to the second user 214 over the communication network 120. As described in greater detail below, an incoming call received by the first user from the second user can be handled while the first user is playing a game. Similarly, the first user may initiate a call to the second user while playing the game.

The user 202 can initiate a call in the manner described in greater detail below. The call set-up is performed using proprietary protocols, and the route over the network 120 between the calling user and called user is determined by the peer-to-peer system without the use of servers. Following authentication through the presentation of digital certificates (to prove that the users are genuine subscribers of the communication system—described in more detail in WO 2005/009019), the call can be established.

The user 202 can select to answer an incoming call in the manner described in greater detail below. When the video call is established with the second user 214, voice packets from the user terminal 216 begin to be received at the communication client 110. When the second user 214 talks into handset 222, the client 220 executed on user terminal 216 encodes the audio signals into VoIP packets and transmits them across the network 120 to the games system 150. The VoIP packets are received at the client protocol layer 113 (via the console library), provided to the client engine 114 and passed to the voice engine 116. The voice engine 116 decodes the VoIP packets to produce audio information. The audio information is passed to the console library 170 for output via the speaker 112.

The user 202 is able to utilise the games system 150, and specifically the game application 160 to play a game whilst receiving and initiating calls.

Figure 3:
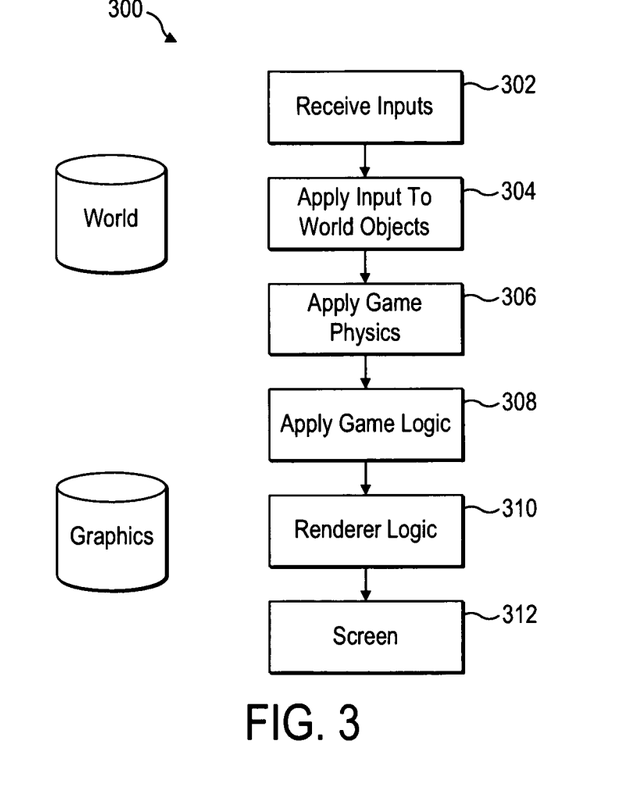
FIG. 3 is flow diagram of a method carried out by the electronic gaming system illustrated in FIG. 1.

FIG. 3 is a flow diagram of a method 300 carried out when the game application software is executed. The game application creates a game world representing the current state of the game. The game world comprises game objects corresponding to conceptual objects in the game that a player of the game may interact with. Some of the game objects, such as game characters may be graphic objects which are controlled by the players. In a first step 302 the executing program receives one or more inputs. These may be, for example, inputs from the input devices controlled by the game players or data from the game memory. In a next step 304 the inputs are applied to the game world. For example, the inputs may be applied to the world objects created by the game software. The inputs dictate how the game objects react, move or behave, or what selections are made. The effect of inputs is determined by the current state of the game so that, for example, certain key presses will have different effects in menus, characters or different game views.

In a next step 306 game physics are applied to the game world. The game physics represent the rules by which objects in the game environment move and interact. For example, the game physics may be based on real-life physics so that the movement and interaction of game objects closely resembles behaviour in the real-world. Alternatively, the game physics may be defined so as to cause objects to behave differently to the real-world. In some games, it may not be necessary to apply game physics. For example, a quiz game would not require the application of game physics.

In a next step 308, game logic is applied. Game logic dictates how the state of the game changes according to the movement and behaviour of game objects and other events occurring in the game. For example, if a game character comes into contact with some other object, the character may be given special properties, gain points, lose a life and the like. In a quiz game, the game logic may determine who pressed a buzzer first and determine that this is the game participant who should answer a question.

In a next step 310, the game environment and objects within it are rendered using render logic. The render logic receives an input from the game logic and the game world and controls what graphics should be written to the frame buffer and output to the screen. Data corresponding to a visual representation of the game environment is generated, and, in a next step 312, the data is provided to the frame buffer resulting in the game environment being displayed to the players.

The above process 300 is repeated until the game terminates.

In multi-player games, each player typically controls a specific game character. In order that characters can be distinguished by the game software so that, for example, each player's control can be applied to the correct game character, each game character is typically associated with a unique character identification. Each game object created by the game application is associated with a unique identity which is stored in the game memory 118 and accessible by the game application. The object identities are used by the game application to distinguish between different objects. The game memory comprises an object database storing the identities of all of the objects in the game environment together with any other associated information. In some game applications, users are given the facility to create their own customised characters. A character may be customised with respect to its appearance, behaviour or other attributes of the character. When a user has created or customised a character, the character is assigned an identification which is stored in the object database in the game memory 118.

The system illustrated in FIG. 1 allows the user to establish a mapping between the user's contacts and game objects, such as game characters. In this way, the game characters can be used to represent contacts, and by interacting with the game characters while playing the game, the user is able to perform communication functions, such as initiating a call with a contact or receive an incoming call. By using the game interface to perform communication functions rather than a dedicated communication interface, the game player does not need to interrupt the game.

The performance of communication functions may be performed at any appropriate point during which the game application is running. For example, a call may be initiated before a game has begun at the point at which the player is making game character selections and setting user preferences.

The game application may include a menu accessible during game set-up which allows a user to select a game character in order to initiate a call before the game has begun. Alternatively or additionally, the player may perform a communication function while the game is in progress by interacting in a specific way with objects that have been associated with contacts. The game application is modified so that when specific interaction occurs, the appropriate communication function is performed by the communication client.

Figure 4A:
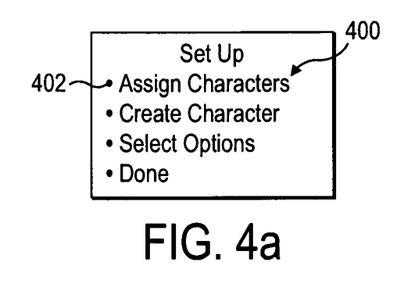
FIG. 4 shows a user interface allowing a user to define a mapping between a contact and a game character.
Figure 4B:
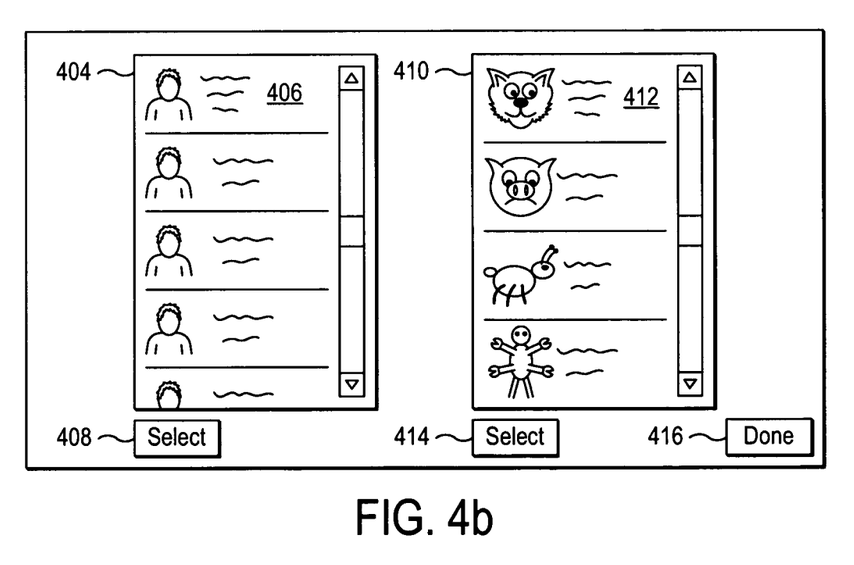

In order to associate contacts with game objects, the game application may include a menu including various selections. FIGS. 4a and 4b illustrate an exemplary interface for associating contacts with game characters. In this embodiment, the menu 400 is accessible during game set-up. One of the selections 402 available from the menu 400 is to assign a contact to a game character. Upon making the appropriate menu selection, the game application initiates the retrieval of the contact list from the communication client. The contact list is displayed to the user in any suitable manner on the game console display. For example, as shown in FIG. 4b, the contacts may be displayed as a first list 404. Using the input devices, the user selects one of the contacts he wishes to assign to a game character, for example by clicking on a contact 406 and clicking on a select button 408. A list of game characters is retrieved from the game memory 118 and displayed to the user in any suitable manner. For example, as shown in FIG. 4b, the characters may be displayed as a second list 410. Using the input devices, the user selects one of the characters he wishes to be assigned to the selected contact, for example by clicking on a character 412 and clicking on a select button 414. The user may complete the process by clicking on a done button 416.

Upon making these selections the character identifier is retrieved from the game memory by the game application. A STORE instruction is provided to the communication client from the games application. The STORE instruction includes an identification of the contact selected by the user and the character identifier of the selected character. Upon receiving a STORE instruction, the user terminal stores the game character identifier and any other relevant information in association with the contact information in the contact database 115. Other relevant information may include, for example, the game to which the character relates.

The above process of assigning contacts to characters maybe repeated any number of times to assign other contacts to characters. Multiple contacts may be assigned to single characters and a single contact may be assigned to multiple characters. In this way one or more contacts are each assigned to one or more (or zero) characters. The result is that a mapping between users and game characters is defined. The mapping may be defined in any suitable way. For example, in one embodiment the user terminal stores contact information which includes an identification of game characters, if any, assigned to each contact.

Figure 5:
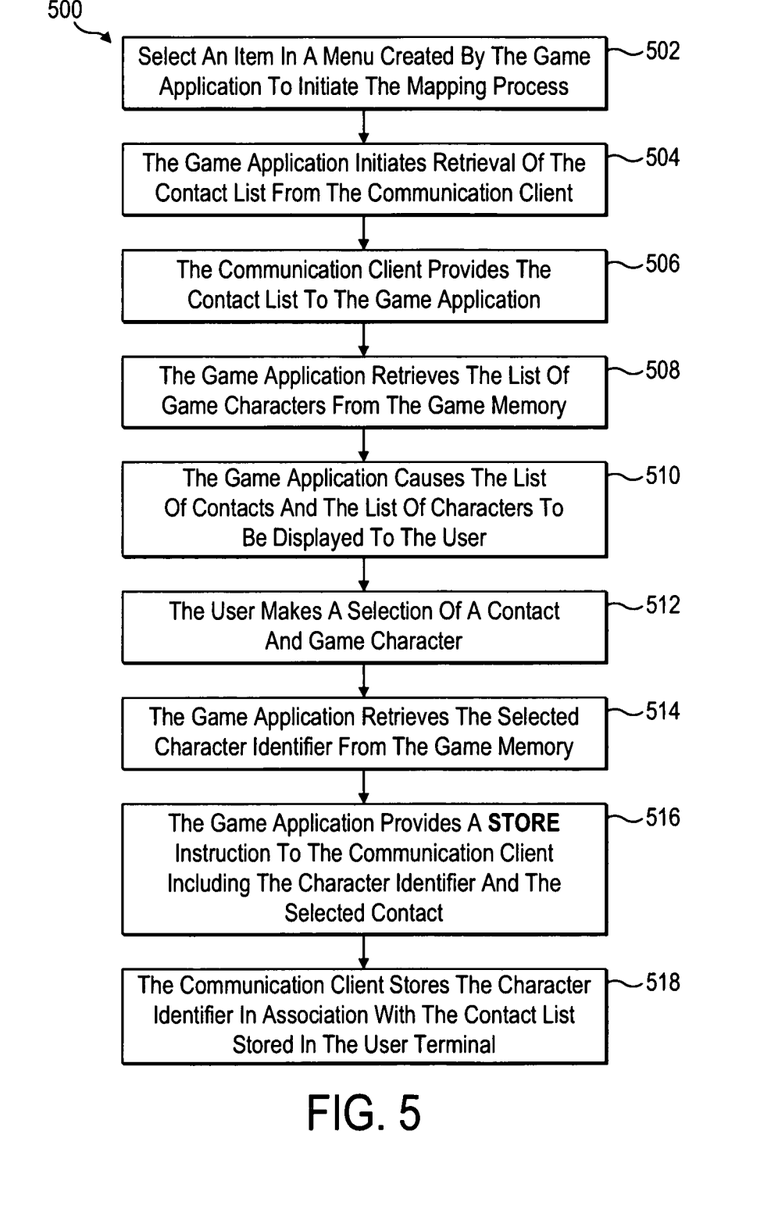
FIG. 5 is a flow diagram of a process used to define a mapping between a contact and a game character.

FIG. 5 is a flow diagram illustrating a process 500 to define a mapping between game characters and users. In a first step 502 an item in a menu created by the game application is selected to initiate the mapping process. In a next step 504, the game application initiates retrieval of the contact list from the communication client. In a next step 506, the communication client provides the contact list to the game application. In a next step 508, the game application retrieves the list of game characters from the game memory. In a next step 510 the game application causes the list of contacts and the list of contacts to be displayed to the user. In a next step 512, the user makes a selection of a contact and game character as described above. In a next step 514, the game application retrieves the selected character identifier from the game memory. In a next step 516, the game application provides a STORE instruction to the communication client including the character identifier and the selected contact. In a next step 518, the communication client stores the character identifier in association with the contact list stored in the user terminal.

Once the process of assigning contacts to characters has been completed, the user is able to initiate calls, be alerted of incoming calls, and respond to incoming calls to those contacts in the game environment.

In one example, prior to beginning a game, for example while the player is making character and other selections, a character to whom a specific contact is assigned may be selected in a special call menu. When the character is selected, the player can initiate a call, for example by pressing a button on their hand held controller or on the console. In another example, the user can initiate a call while playing a game. In this example, the character controlled by the player may be made to interact with a character to whom a specific contact has been assigned. The interaction may comprise the two characters meeting or colliding, at which point the user presses a button on their hand held controller to initiate the call. If multiple contacts have been assigned to the character then a call to all of the contacts may be initiated, thereby allowing the player to initiate conference calls easily.

When a call is initiated in the manner described above, the game application identifies the character the player has selected for making a call and retrieves the corresponding character identification stored in the game memory 118. The game console then transmits a CALL instruction together with the character identification to the communication client. The communication client searches the contacts database 115 to determine which contact or contacts have been assigned to that character. When the contact or contacts have been identified, the client application retrieves the relevant contact identification information and uses this to initiate a call with the contacts. Once a connection with the contact has been established, the client application may provide an input signal to the game application confirming that a call was successfully initiated. Upon receiving the confirmation, the game application may cause the display of the character to be modified, such as by changing colour, to indicate that a call with the contact assigned to the character is in progress.

The player may be alerted of any incoming calls by visual or audible means. For example, if a call from a specific contact is received, the character to whom that contact is assigned may be caused to perform a specific action, such as waving, to alert the player of the incoming call. If the character is not on the screen at the time the incoming call is received, the character may be caused to appear on the screen. Alternatively, or additionally, a noise, sound effect or voice associated with the character may be caused to sound when the incoming call is received, whether or not the character is on screen, to audibly alert the user.

When an incoming call is received at the communication client, the communication client identifies the contact from whom the call has originated. For example, the incoming call set up packet contains the username of the contact who initiated the call. The communication client then searches the contact information stored in the contact database 115 to determine whether or not that contact has been assigned to a game character. If the contact has been assigned to a game character, the communication client retrieves the character identification stored in association with the username of the contact in the contact database 115. The communication client then transmits the character identification to the game application indicating that an incoming call set up request has been accepted from a contact associated with the game character identification. In response the game character application is arranged to alert the player accordingly. For example, the games application may causes the identified character to be rendered and displayed on the screen during the game to signal to the user that a call is incoming.

When the user is alerted of an incoming call by the appearance of the game character associated with the calling contact the user may press the appropriate button on their hand held to interact with the game character in order to answer the call. Upon pressing the button, a selection signal selecting the game character is input to the games application under the control of the console library 170. In response to receiving the selection signal the game application is arranged to transmits an ANSWER instruction to the communication client indicating that the player has chosen to take the call. In response to this instruction, communication client is arranged to complete the call setup allowing the user to communicate with the caller via the input and output devices.

In order to facilitate initiation of calls by game players, those characters to whom contacts have been assigned may be distinguished from other characters in the game. For example, characters to whom contacts have been assigned may be coloured differently or otherwise visually distinguished from other characters. Characters may be rendered to include text on or around the character to specify the contact assigned to that character.

In one embodiment, the user-defined presence status of a contact may be indicated by the appearance of the game character, for example if the contact's presence status is set as 'away' the game character may appear orange.

In one embodiment of the invention contacts that are logged into the communication system using a games console may be indicated by the appearance of the game character, for example the game character may appear blue. In this case a predetermined identifier is used to identify games console devices. The identifier of the device is that a user is logged in with may be transmitted as part of the user's presence information, such that the communication client installed at the terminals of each of the user's contacts may determine that the user is logged onto the communication system using a games console.

In one embodiment of the invention, if a user of the peer to peer communication system is a participant in the game, such that a games system operated by the participant is used to transmit input signals to control the game application executed on the master game system, the game application executed on the master game system may be arranged to associate the username of the participant with the game character that the participant is controlling. In this case the input signals transmitted from the contact may identify the username of the contact such that the game application may determine the username of the game participant.

It can be seen that the techniques described above facilitates the making and receiving of calls and other communication events while participating in computer gaming activities. By making use of the computer game interface as an interface for the communication system a simplification in use and increased convenience is obtained.

While various embodiments of the invention have been described, the skilled person will appreciate that further modifications are possible and that the invention is not limited to the specific examples given above.

The invention claimed is:

1. A method:
   receiving a selection of a game object assigned to a user in an electronic game application, the game object being a game character that is playable by the user to engage in game play as part of the electronic game application, and being configured to assume different visual appearances in the electronic game application based on different presence statuses of the user;
   responsive to receiving the selection associating, by a computing device, contact information for the user with the game object;
   receiving an input during game play to interact with the game object, the game object being displayed during execution of the electronic game application;
   responsive to receiving the input to interact with the game object, establishing a communication event with the user and using the contact information associated with the game object without interrupting game play;

receiving a confirmation that the communication event is successfully established; and responsive to receiving the confirmation that the communication event is successfully established, changing the visual appearance of the game object assigned to the user.

2. A method according to claim 1 in which the step of establishing the communication event comprises answering an incoming communication event set up request.

3. A method according to claim 2 comprising the further step of alerting the user to an incoming communication from a different user by modifying display of the game object.

4. A method according to claim 1 in which the step of establishing the communication event comprises initiating a communication event.

5. A method according to claim 4 comprising the further step of indicating to the user that a different user is available on a communication system by modifying display of a game object associated with a memory item associated with the different user.

6. A method according to claim 2 in which the communication event is one of a voice call; a video call; a conference call.

7. A method according to claim 1 in which the communication event is initiated via a VoIP system.

8. A method according to claim 1 in which the step of associating the contact information with the game object includes the steps of selecting the contact information from a list of contact information, and specifying that an association between the selected contact information and selected game object is to be created.

9. A method as claimed in claim 1 wherein the game object is controllable by the user.

10. A method according to claim 1 further comprising:
receiving a subsequent selection of the game object by a different user; and
responsive to the subsequent selection, storing the contact information for the user in a contact list associated with the different user.

11. A method according to claim 1 in which the game object comprises an avatar.

12. A method according to claim 1 in which receiving the input signal to interact with the game object occurs in response to a selection of the game object or a different game object coming into contact with the game object.

13. A hardware computer readable storage device storing computer executable instructions that are executable by a processor to cause the processor to perform operations comprising:
storing contact information for a first user of a communication system;
receiving an indication of a selection, by a second user, of a game character in an electronic game application for assignment to the first user, the game character being moveable and playable by the first user to participate in gameplay of the electronic game application;
responsive to the second user defining an association between the contact information of the first user and the game character, associating the contact information of the first user with the game character;
receiving an input from the second user to interact with the game character during execution of the electronic game application; and
responsive to receiving the input to interact with the game character, establishing a communication event between the first user and the second user using the contact information of the first user associated with the game character.

14. A hardware computer readable storage device as recited in claim 13, wherein the input from the second user is received in response to a different game character associated with the second user interacting with the game character as part of the electronic game application.

15. A hardware computer readable storage device as recited in claim 13, wherein the computer-executable instructions are executable by the processor to cause the game character to perform one or more visual actions as part of establishing the communication event.

16. A hardware computer readable storage device as recited in claim 13, wherein the computer-executable instructions are executable by the processor to visually distinguish the game character from one or more other game characters based on the one or more other game characters not being assigned to a respective contact.

17. A system comprising:
one or more processors;
one or more memory devices storing computer readable program instructions executable by the one or more processors to perform operations including:
storing contact information of a first user of a communication system;
receiving an indication of a selection, by a second user, of a game object in an electronic game application for assignment to the first user, the game object being a game character that is moveable and playable by the first user to participate in gameplay of the electronic game application;
responsive to the indication of a selection of the game object, associating the contact information of the first user with the game object;
receiving an input from the second user to interact with the game object; and
responsive to the interaction of the second user with the game object, establishing a communication event between the first user and the second user using the contact information of the first user associated with the game object.

18. A system as recited in claim 17, wherein the input from the second user is received in response to a different game object associated with the second user interacting with the game object as part of the electronic game application.

19. A system as recited in claim 17, wherein the game object is configured to assume different visual appearances in the electronic game application based on different presence statuses of the first user.

20. A hardware computer readable storage device as recited in claim 13, wherein the computer-executable instructions are executable by the processor to cause the game character to assume different visual appearances in the electronic game application based on different presence statuses of the first user.

* * * * *